Patented June 29, 1926.

UNITED STATES PATENT OFFICE.

EMIL CZAPEK AND RICHARD WEINGAND, OF BOMLITZ, GERMANY.

PROCESS FOR THE PRODUCTION OF HOLLOW BODIES FROM VISCOSE AND SIMILAR CELLULOSE SOLUTIONS.

No Drawing. Application filed October 1, 1924, Serial No. 741,051, and in Germany October 15, 1921.

This invention relates to a process for the production of hollow bodies from viscose and similar cellulose solutions, for instance, bottle caps, cups and the like.

Processes of producing hollow objects from cellulose are already known, in which a film of viscose in conjunction with a rubber or caoutchouc base is distended by liquid pressure, to a hemispherical shape and, after removal of the rubber base, is dried upon a mold. In other processes, molds of slightly larger dimensions than those corresponding to the hollow body to be produced, are dipped into cellulose solutions, a layer is precipitated on the mold and the body thus produced is pulled off and dried upon a slightly smaller mold. All these processes have the disadvantage that only half sections of hollow bodies can be produced since in the case of closed or almost closed hollow bodies it is impossible to put the cellulose film over the drying mold. Moreover, the removal of the dried hollow bodies from the molds offers difficulties and the whole process is comparatively circumstantial.

Complete hollow bodies of spherical shape have already been produced from collodion by rinsing a glass vessel with dehydrated collodion, and after drying, loosening the film produced, from the interior wall of the glass vessel by suction. However, there are great differences in working with viscose and collodion solutions. In one case the formation of a film by evaporation of a solvent is met; however, the formation of a cellulose film from viscose solutions is based on the precipitation of cellulose by an electrolyte. Moreover, whilst collodion films when formed, need not be after-dried, films precipitated from viscose constitute a mass having a high water-content and requiring special after-drying. It is however just the drying of the semi-hollow bodies which alone could hitherto be produced from viscose which is attended with difficulties, inasmuch as these semi-hollow bodies are very liable to tear on removal from the drying mold.

The present invention provides a process which renders it possible to produce from viscose and similar cellulose solutions, closed or almost entirely closed hollow bodies, in a simple manner whilst overcoming the difficulties encountered in the hitherto known processes.

According to the process of the invention the interior of a suitable hollow mold is rinsed with solution in a manner known per se, and this solution is thereupon precipitated within the mold by means of a precipitant, whereupon the hollow film-like body is removed from the interior of the mold, in a moist state, and after being rendered insoluble and washed out, is dried in a distended state.

It has been found that such thin-walled bodies of cellulose formed in the interior of a hollow mold may be easily pulled out from said hollow mold because their tendency to shrink assists in their removal from the wall of the hollow mold. Moreover drying over mold bodies is no longer required, and the carrying out of the new process is also simple in all other respects. By employing suitable hollow molds, almost entirely closed hollow bodies can be produced from the solutions of cellulose compounds, inasmuch as in such case the hollow bodies need have only a small opening for the introduction of the precipitant which opening may subsequently be closed by applying a drop of the solution.

The present process may be carried out in detail for example in the following manner: The hollow mold corresponding to the object to be produced, for example a glass mold or flask, is rinsed out internally with a suitable amount of cellulose solution in such a way that the solution covers the interior surface of the mold as a uniform layer. Thereupon a precipitant is introduced through the neck of the flask, so that the cellulose layer is precipitated in the interior of the flask. In order to rinse the mold or other vessel uniformly with the cellulose solution, and, precipitant, it may be subjected to a rotary movement.

A film capsule or cap may be made in a flask-shaped mold having a contracted neck through which the formed cellulose film fitting the hollow mold is now pulled out from the interior of the flask by holding the neck portion, after which it is rendered insoluble, washed and finally dried in a distended state.

The thickness of the walls of the hollow cellulose bodies according to the amount of initial material used, is greater or less. If the cellulose balloon or hollow body is to be closed entirely, a drop of the starting solution is applied as a closure to the open neck part. Instead of balloon shapes, any desired other shapes can of course be produced according to the new process. Thus for example also closed bodies with projecting portions for example, tops or faces of greater thickness than the other portions of the cap or with a knob or projection about the top of the cap faces may be produced.

The hollow bodies produced may also be subdivided for attaining the finally desired shape. Thus for example hollow bodies having an elliptical cross-section may be produced from cellulose by employing a correspondingly shaped hollow mold and the hollow bodies produced may be cut through the centre to form two parts of capsule shape. These capsules may be used in a known manner for closing vessels, such as medicine bottles and the like, being applied to the vessel to be closed in a moist state, and subsequently dried.

Having now particularly described and ascertained the nature of our said invention and in what manner the same is to be performed, we declare that what we claim is:—

1. The process of producing caps for bottles or other hollow articles from viscose cellulose which consists in rinsing out the interior surface of an open mold with a solution of viscose-cellulose to form a coating therein, applying upon said coating a precipitant to precipitate within the mold a cellulose film, removing the film while in a moist condition from the interior of the mold, rendering the film so produced insoluble in water, washing the film, distending the product to its final shape and drying the finally shaped product.

2. The process of producing molded bodies from viscose cellulose solutions, which consists in rinsing out the interior surface of a mold with a viscose solution, covering this coating with a precipitant, precipitating the solution, removing the precipitated film in a moist state from the mold, reshaping the same and in subsequently washing and drying the reshaped product.

3. The process of producing a hollow body from viscose and similar cellulose, which consists in applying to the interior of a mold a uniform layer of viscose-cellulose to coat the same, then coating such surface with a precipitating solution, subjecting the cellulose while maintained by the mold to a precipitant, removing the produced film in a moist state from the mold, and in then washing and drying the resultant product while in a distended form.

In testimony whereof we have signed our names to this specification.

Dr. EMIL CZAPEK.
RICHARD WEINGAND.